(12) United States Patent
Studer et al.

(10) Patent No.: US 10,183,345 B2
(45) Date of Patent: Jan. 22, 2019

(54) METHOD FOR DEBURRING THE EDGES OF INTERSECTING BOREHOLES, AND TOOL FOR IMPLEMENTING THE METHOD

(71) Applicant: Heule Werkzeug AG, Balgach (CH)

(72) Inventors: Harry Studer, Balgach (CH); Roman Faessler, Marbach (CH)

(73) Assignee: Heule Werkzeug AG, Balgach (CH)

( * ) Notice: Subject to any disclaimer, the term of this patent is extended or adjusted under 35 U.S.C. 154(b) by 0 days.

(21) Appl. No.: 15/379,828

(22) Filed: Dec. 15, 2016

(65) Prior Publication Data

US 2017/0173707 A1  Jun. 22, 2017

(30) Foreign Application Priority Data

Dec. 16, 2015 (DE) .................... 10 2015 016 277

(51) Int. Cl.
*B23B 51/10* (2006.01)
(52) U.S. Cl.
CPC .......... *B23B 51/101* (2013.01); *B23B 51/102* (2013.01); *B23B 51/105* (2013.01);
(Continued)
(58) Field of Classification Search
CPC ... B23B 51/101; B23B 51/102; B23B 51/103; B23B 51/105; B23B 51/10;
(Continued)

(56) References Cited

U.S. PATENT DOCUMENTS 2,458,753 A * 1/1949 Wallace ............ B23B 29/03457
408/180
2,620,689 A * 12/1952 Cogsdill ............... B23B 51/101
408/187

(Continued)

FOREIGN PATENT DOCUMENTS

DE  931024  7/1955
DE  102015002503  2/2015
(Continued)

OTHER PUBLICATIONS

Office Action in corresponding European Patent Application No. EP 16 002 173.9, dated Apr. 5, 2017, 11 pages.
(Continued)

*Primary Examiner* — Daniel Howell
(74) *Attorney, Agent, or Firm* — Wood Herron & Evans LLP

(57) ABSTRACT

A deburring tool with a deburring blade (9) for deburring borehole edges (3, 6) that have a straight or un-round shape, consisting of a base body (12) which is rotatably driven about its longitudinal axis (50), and at the lower end of which at least one blade holder (20) with at least one deburring blade (9) secured therein is mounted on a blade bearing (27) on the side of the base body so as to swivel vertically, and on the outer periphery of the blade holder (20) a control groove (31) which is open radially outward is arranged, into which the freely flexible end (30a) of a flexible spring (30) engages, the other end of said spring being clamped to the base body (12), wherein during the deburring process, the deburring blade (9) is swiveled away from the base body (12) at an angle (51, 52, 53) in relation to the longitudinal axis of the base body (12), and the blade axis (55) of the deburring blade (9) rests, spring-loaded, with its at least one cutting edge (39) against the borehole edge (3, 6) to be deburred, and executes spring-loaded swiveling movements that follow the contour of the borehole edge (3, 6) as the deburring tool is rotated, wherein the blade axis (55) of the deburring blade (9), in the home position in which it is swiveled away from the base body, forms an angled swivel position (52, 53) that deviates from the 90-degree position, and in that a backstop is assigned to the deburring blade (9), which prevents it from swiveling back into the position in which it is swiveled at a 90-degree angle from the base body (12).

10 Claims, 18 Drawing Sheets

Figure 1:
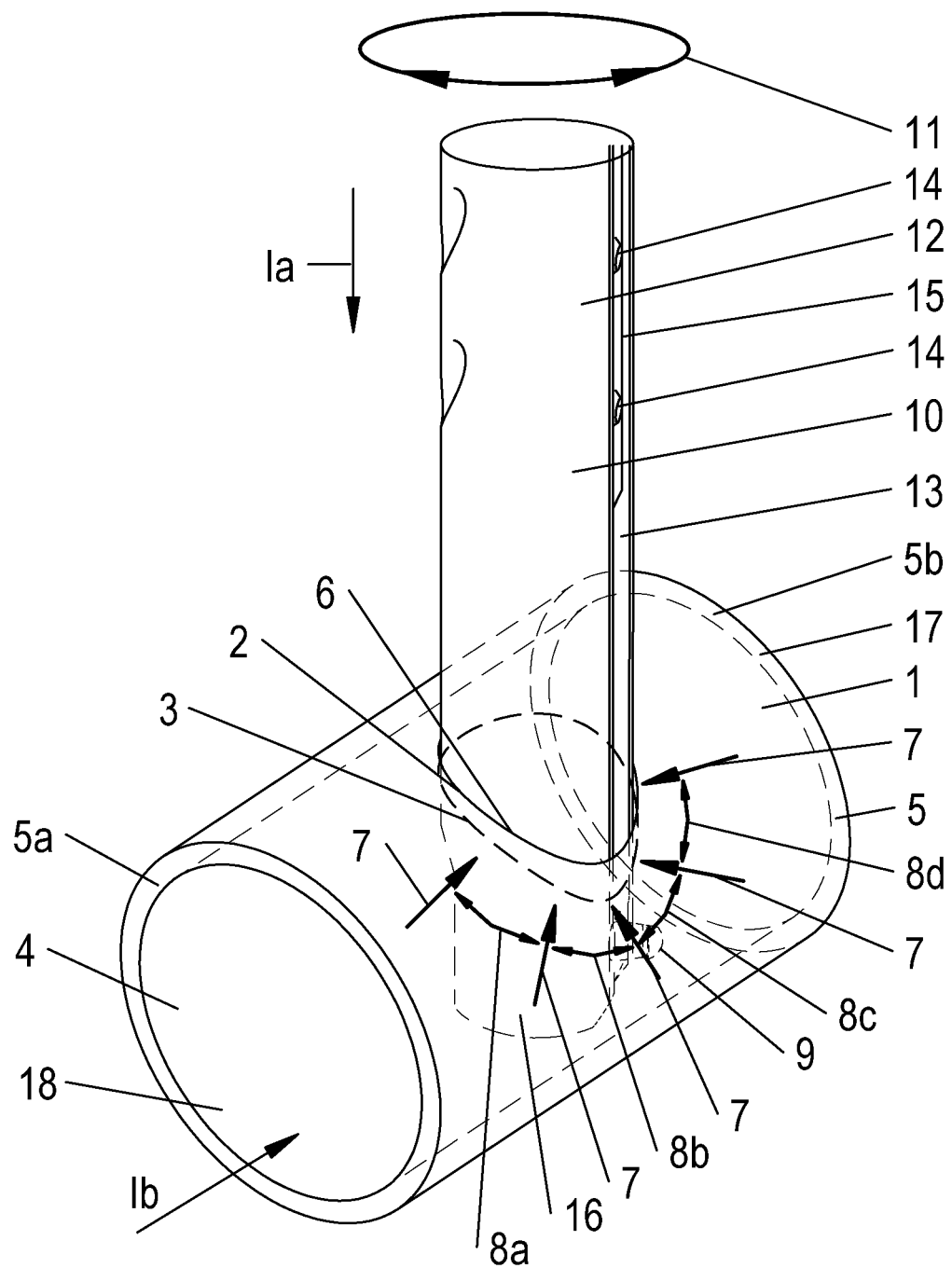

(52) U.S. Cl.
CPC ....... *B23B 2220/08* (2013.01); *B23B 2251/54* (2013.01); *B23B 2260/136* (2013.01); *Y10T 408/8595* (2015.01)

(58) Field of Classification Search
CPC ............. B23B 2220/04; B23B 2220/08; Y10T 408/8595; Y10T 408/8593
See application file for complete search history.

(56) References Cited

U.S. PATENT DOCUMENTS

| | | | |
|---|---|---|---|
| 2,895,356 A | | 7/1959 | Cogsdill |
| 3,195,378 A | * | 7/1965 | Cogsdill ............... B23B 51/102 |
| | | | 408/26 |
| 4,690,594 A | * | 9/1987 | Kato ..................... B23B 51/105 |
| | | | 408/159 |
| 5,135,338 A | * | 8/1992 | Heule ................... B23B 51/101 |
| | | | 408/187 |
| 5,704,743 A | * | 1/1998 | Goorsenberg ........ B23B 51/102 |
| | | | 408/159 |
| 8,540,464 B2 | * | 9/2013 | Heule ................... B23B 51/101 |
| | | | 408/154 |
| 9,550,236 B2 | * | 1/2017 | Heule ................... B23B 51/101 |

FOREIGN PATENT DOCUMENTS

| | | | | |
|---|---|---|---|---|
| EP | 0446767 | | 6/1991 | |
| GB | 2223550 A | * | 4/1990 | ............ F16L 55/179 |
| WO | 2013044589 | | 4/2013 | |

OTHER PUBLICATIONS

Office Action in corresponding German Patent Application No. DE 10 2015 016 277.2, dated Jul. 19, 2017, 5 pages.

* cited by examiner

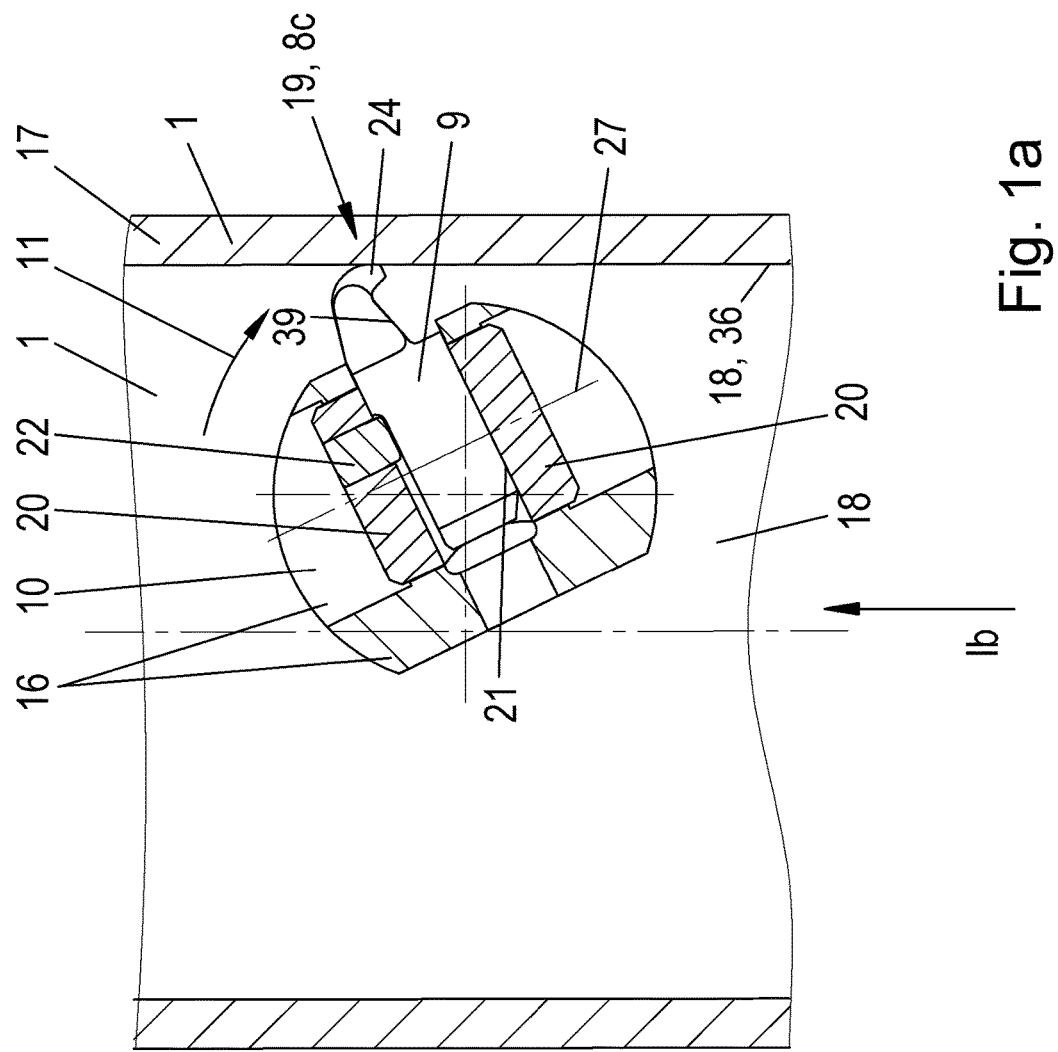

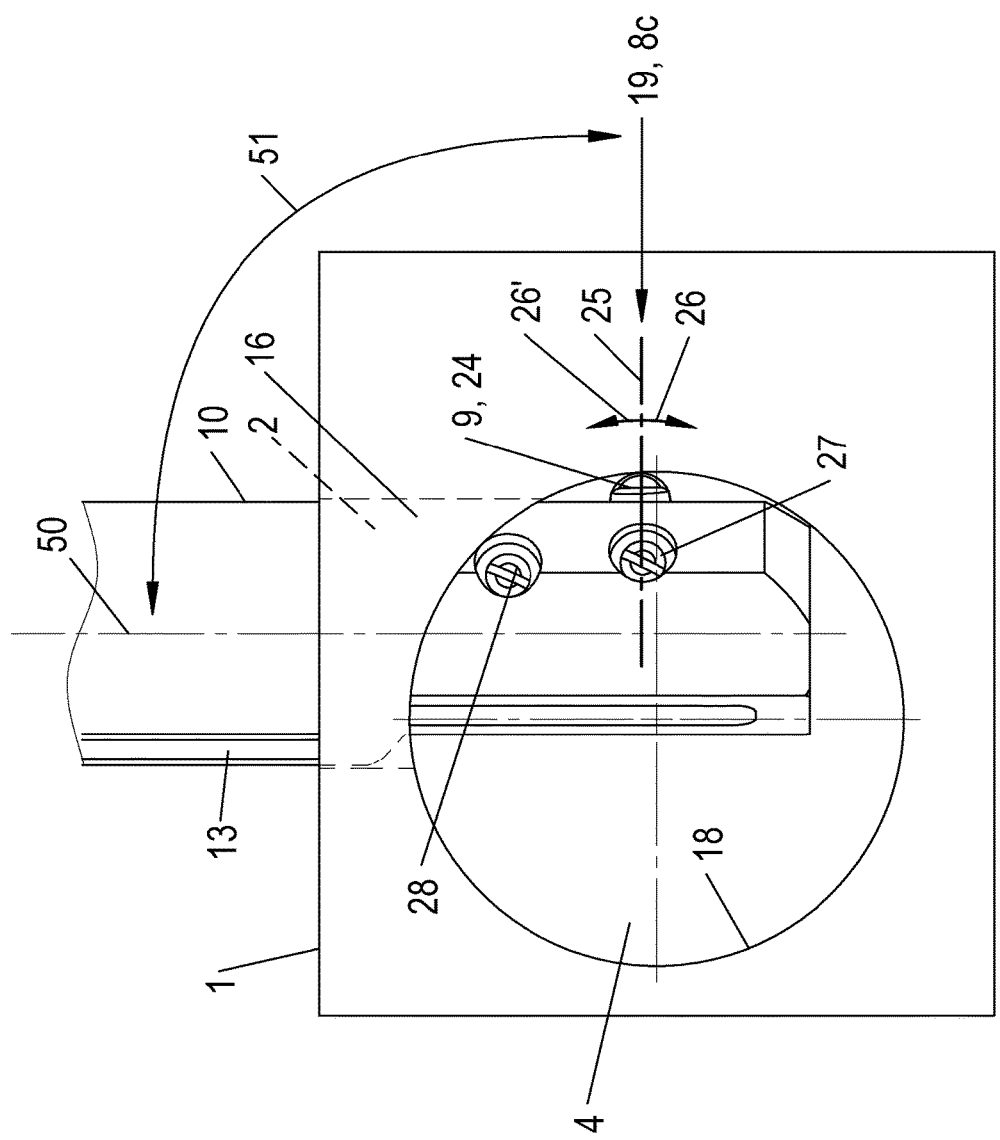

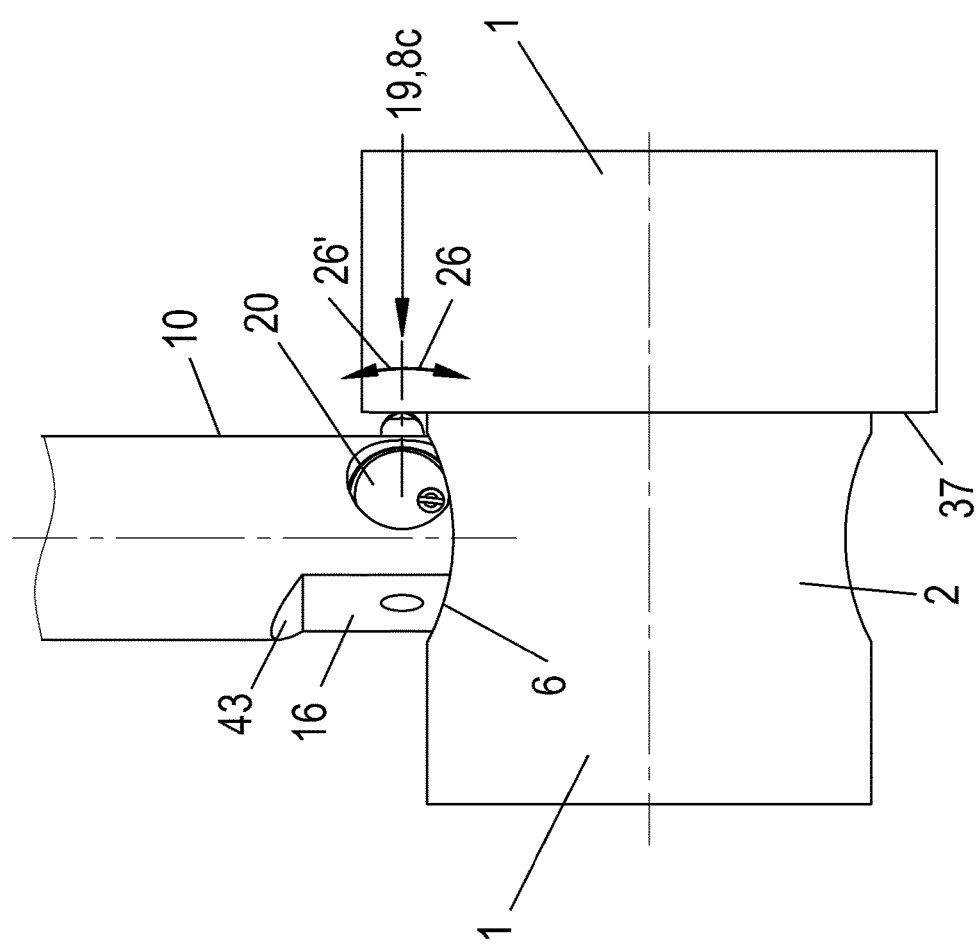

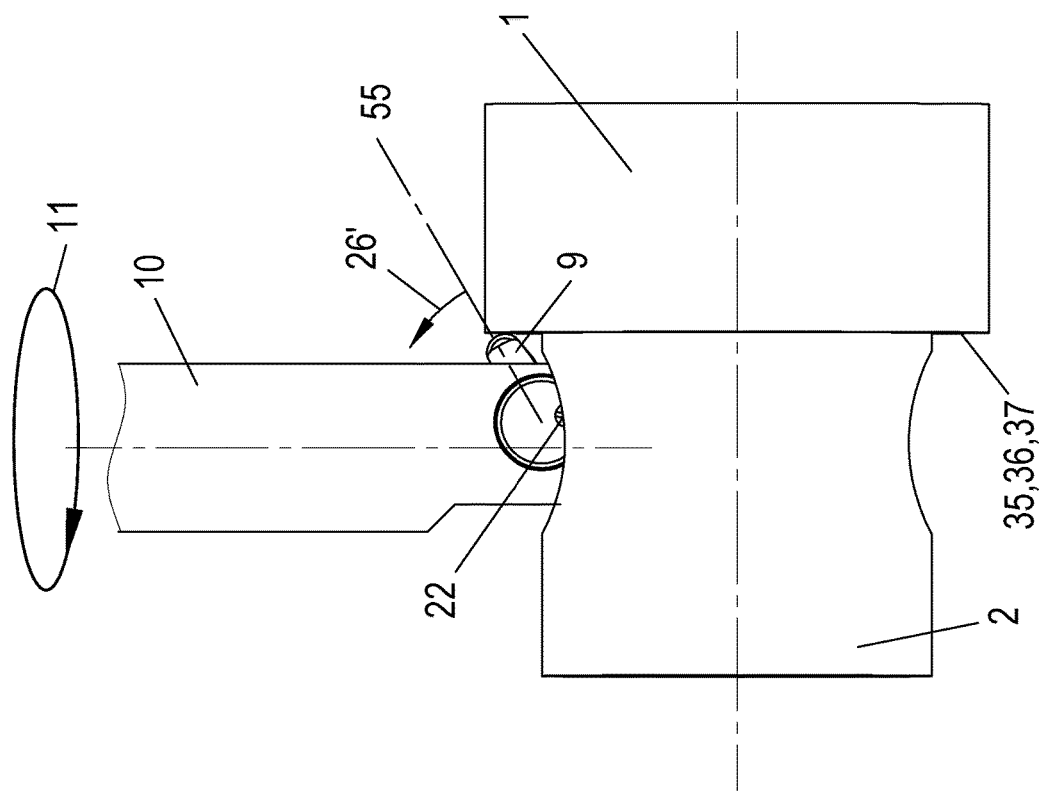

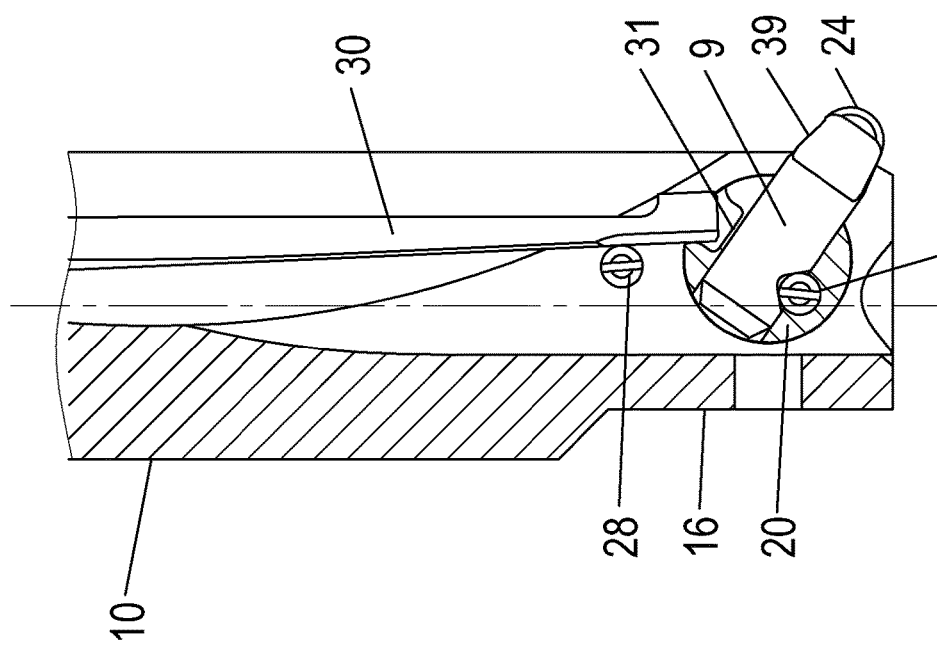

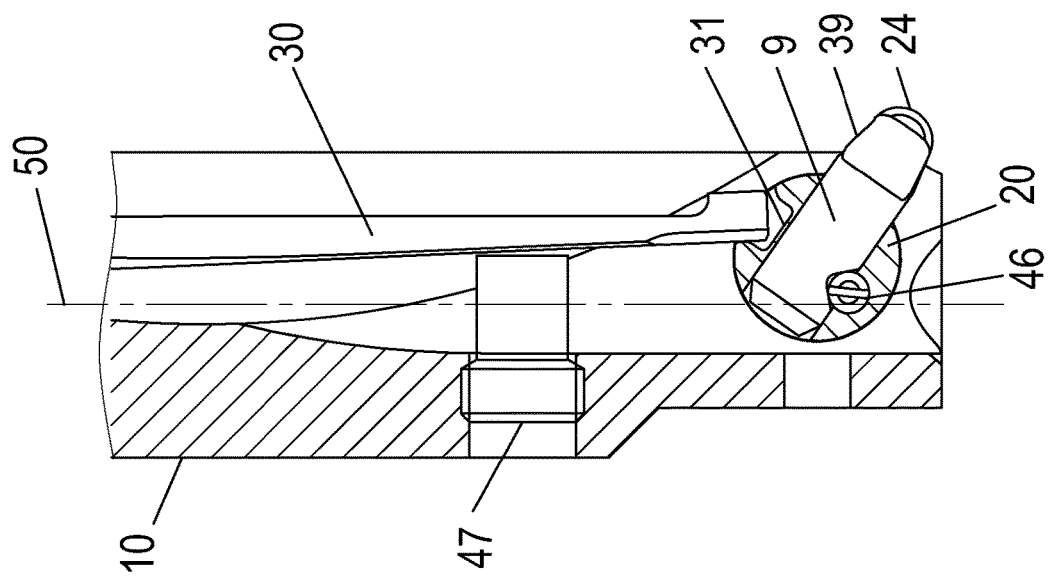

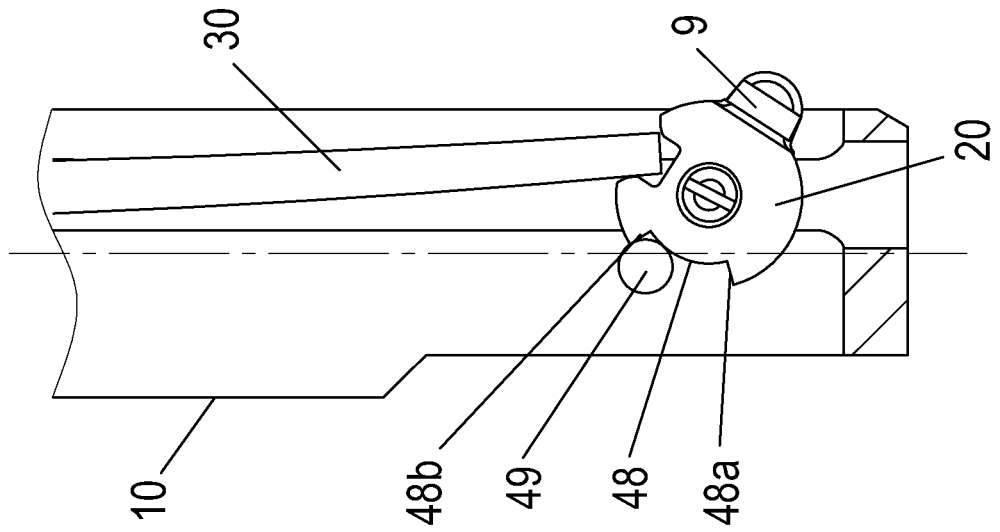

METHOD FOR DEBURRING THE EDGES OF INTERSECTING BOREHOLES, AND TOOL FOR IMPLEMENTING THE METHOD

The invention relates to a method for deburring intersecting borehole edges, and to a tool suitable for this purpose, according to the preamble of claim 1.

EP 0446 767 B1 and EP 2 671 656 A1, originating from the same applicant, each disclose a deburring tool for deburring borehole edges that have an even or uneven shape, said tool having a base body which is rotatably driven about its longitudinal axis, in which base body at least one bar-shaped deburring blade is secured in a blade holder which is swivelably mounted in the base body.

The deburring tool consists of a base body which is rotatably driven about its longitudinal axis, and in which at least the one blade holder with at least one deburring blade secured therein is mounted on a blade bearing on the side of the base body so as to swivel vertically. The blade holder is embodied as an approximately cylindrical or disk-shaped body, held rotatably in a bearing bore of the base body.

On the outer periphery of the blade holder, a control groove is arranged, which is directed radially and is open outward, and into which the freely flexible end of a flexible spring engages, the other end of which is clamped on the base body.

Such a deburring tool is a proven tool for deburring borehole edges that have an even or uneven shape.

When the deburring tool is in the home position, the deburring blade is swiveled outward in a spring-loaded manner at an angle of 90° relative to the longitudinal axis of the base body.

In the operating position, the blade is swiveled upward or downward from its 90° angle swiveled home position, spring-loaded by the bending force of the flexible spring, by angles of e.g. 30° from this 90° angle swiveled position, until it comes to rest, spring-loaded, against the uneven borehole edge, where it can then be used to carry out a deburring machining process.

The present invention uses such a proven deburring tool. The features of the deburring tool as described in EP 0 446 767 B1 and EP 2 671 656 A1 therefore apply to this invention.

However, problems are encountered with the deburring of uneven borehole edges in cases that involve the deburring of two boreholes that intersect along the angles of their longitudinal axes.

A first difficult deburring case is one in which, for example, a cross bore is arranged in a tubular workpiece, passing (at an angle or straight) through the shell of the tubular workpiece, thus forming an asymmetrical shell contour in the wall of the tubular workpiece, which is to be deburred according to the invention.

The invention defines this asymmetrical shell contour as an interfering contour, because deburring a cross bore that extends through the longitudinal bore involves particular difficulties, and the interfering contour, which will be defined at a later point, means that the deburring blade collides with certain portions of this interfering contour, potentially causing the deburring blade to break.

The deburring of boreholes that have interfering contours involves the problem that the deburring blade, with its spherical tip, collides tangentially with the interfering contour and is unable to back away from it.

Thus in the case of a break, the blade axis of the deburring blade is perpendicular to a tangent applied to the inner periphery of the borehole.

This case occurs when the longitudinal axis of the blade is precisely perpendicular to the plane of the borehole inner periphery, and therefore no deflecting torque is acting on the deburring blade, causing the blade to become passively stuck in, and unable to back away from, the 90-degree swiveled position, because no—positive or negative—deflecting torque is acting on the deburring blade. As a result, a breaking load is able to act on the deburring blade, which breaks because it is unable to back away by swiveling out of the 90-degree swiveled position.

Cases that involve the risk of breakage of the deburring blade can occur both with the internal deburring of borehole intersections and with the external deburring of borehole intersections of intersecting boreholes.

Another case of interference occurs when a cross bore to be deburred lies so close to a protruding bore flange that the cross bore which intersects with the main tube and is to be deburred is also situated opposite and spaced a short distance from the protruding tube flange, and during deburring of the cross bore, the deburring blade collides with the protruding tube flange and is likewise unable to back away.

It is therefore the object of the invention to develop a method and a deburring blade of the aforementioned type which is suitable for said method such that cross bores in a cross piece that have interfering contours can also be deburred easily and reliably, without risk of breaking the deburring blade.

To achieve the stated object, the invention is characterized by the technical teaching of claim 1.

It is a feature of the invention that the neutral position of the deburring blade is no longer the position in which it is swiveled outward at a 90° angle from the base body of the deburring tool, and instead the blade axis of the deburring blade occupies a swiveled position which is tilted in relation to the neutral position, and a backstop is assigned to the deburring blade, which prevents the blade from swiveling back into the 90-degree position.

The invention thus consists in that the previous neutral angle of 90° that existed between the longitudinal blade axis (=blade axis) of the deburring blade and the longitudinal axis of the deburring tool is now decreased according to the invention when the deburring tool is operated in the reverse deburring direction, specifically by a negative additional angle, which ranges between 0° and 80°, whereas during forward deburring, the additional angle is 0° to 80°, but in the positive direction.

It is specified by way of example that during reverse deburring, the deburring tool is moved vertically upward relative to the workpiece. In this case, the blade axis of the deburring blade is directed obliquely downward (opposite the feed direction). The additional angle that describes this oblique position of the blade axis is therefore characterized as "negative".

Conversely, in this example, during deburring of a borehole edge in the forward direction, the deburring tool is moved vertically downward relative to the workpiece. In this case, the blade axis of the deburring blade is directed obliquely upward (opposite the feed direction). The additional angle which describes this oblique position of the blade axis is therefore characterized as "positive".

A method for operating a deburring tool of this type for deburring intersecting boreholes is provided in that the deburring tool, with its longitudinal axis, is first 1) moved, in a first method step, up to the cross bore in a centered direction of movement which is concentric with the longitudinal axis of the cross bore, 2) in that in a second method step, a traversing movement is carried out perpendicular to the longitudinal axis of the cross bore, allowing the deburring tool to be introduced into the cross bore without colliding with the edge of the cross bore,
3) in a further method step, a parallel forward feed movement, parallel to the longitudinal axis of the centered forward feed movement, is carried out, in which the deburring tool enters the cross bore,
4) in a further method step, the deburring tool is shifted back in the transverse direction, opposite the aforementioned transverse direction, specifically into the center of the cross bore, and
5) in a further method step, the tool is then moved forward concentrically with the longitudinal axis of the cross bore, specifically until the starting position of the deburring tool with the deburring blade on the inner borehole to be deburred is reached,
6) and in that, in the next method step, the deburring tool is then rotationally driven with its deburring blade, which protrudes from the body of the deburring tool, in contact with the borehole edge to be deburred, and with the deburring tool in rotational operation, the tool is pulled back out of the cross bore, specifically along a centered axis which is concentric and coaxially with the longitudinal axis of the cross bore.

The oblique position of the deburring blade during the aforementioned sequence of method steps combined with the backstop constantly ensures that the deburring blade cannot reach an undesirable dead-center position, where deflecting forces are no longer acting on the deburring blade, causing the deburring blade to collide with the interfering contour of the cross bore and break off there.

The intended, preset oblique position of the deburring blade, i.e. an angular position of the longitudinal axis of the deburring blade in relation to the longitudinal axis of the deburring tool, constantly ensures that the deburring blade can be deflected in either one or the other direction, and that no damaging transverse forces can act on the deburring blade that would hold the deburring blade in an undesirable neutral position, causing the deburring blade to break. For this purpose, a backstop is used, which prevents the deburring blade from swiveling into the 90-degree position.

The invention is not limited to the deburring of borehole edges of cross bores which are arranged in workpieces that likewise have longitudinal bores.

The invention relates generally to the deburring of non-round borehole contours, with the term interfering contour being defined as meaning that an interfering contour exists whenever there is a risk that the deburring blade, in its position protruding at a 90° angle from the deburring tool, may collide with a borehole contour and—depending on physical conditions—be unable to move either forward or backward, causing the deburring blade to break.

The subject matter of the present invention results not only from the subject matter of the individual claims, but also from the combination of the individual claims with one another.

All details and features disclosed in the documents, including in the abstract, in particular the spatial configuration shown in the set of drawings, are claimed as being essential to the invention, to the extent that they are novel, individually or in combination, over the prior art. Where individual subjects are designated as "essential to the invention" or "critical", this does not mean that these subjects must necessarily form the subject matter of an independent claim. This is determined solely by the version of the independent claim that is applicable in each case.

In the following, the invention will be described in greater detail in reference to drawings that depict a plurality of embodiments. Additional features that are essential to the invention and advantages of the invention will be apparent from the drawings and from the description thereof.

Figure 1C:
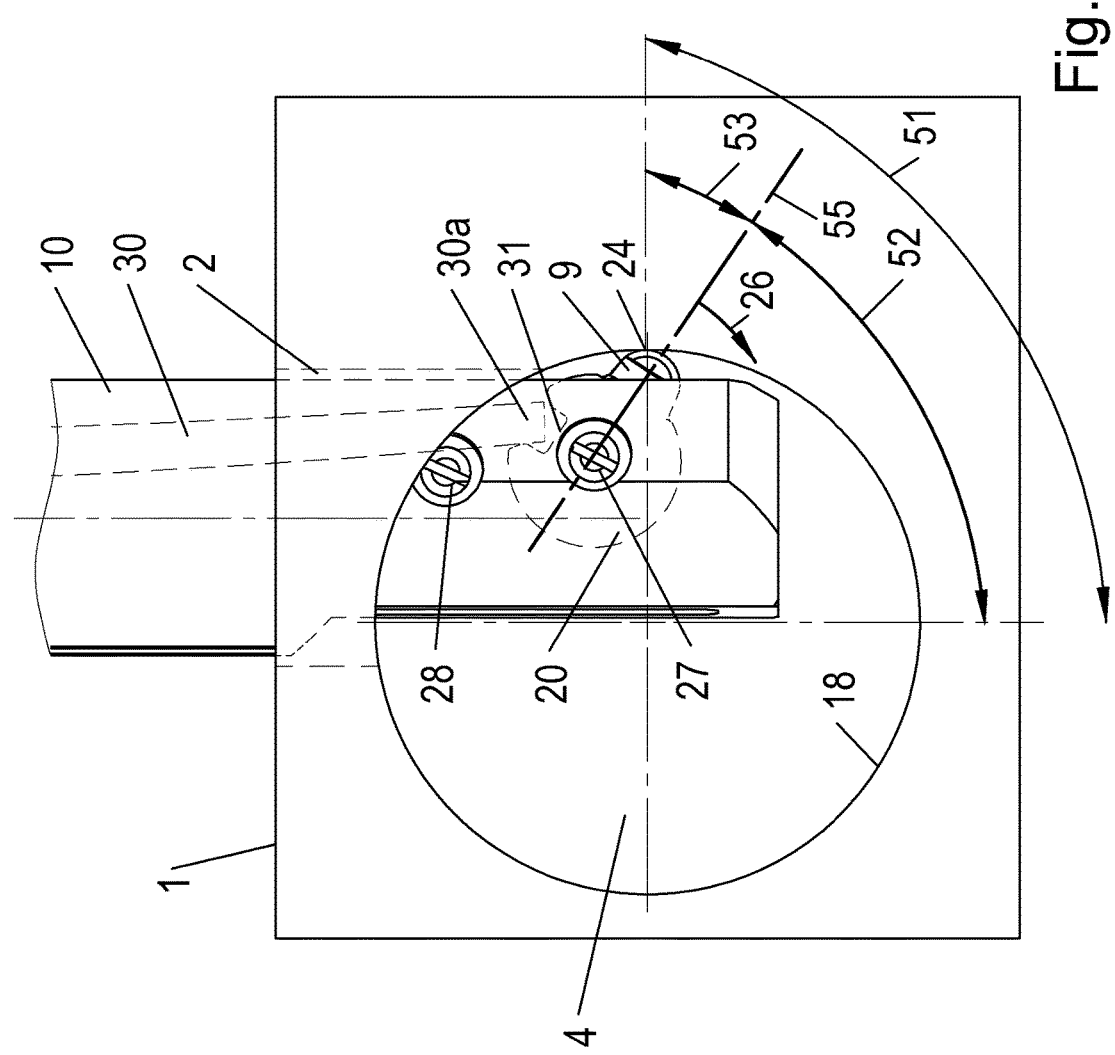

The drawings show:

FIG. 1: a schematic diagram of the deburring of a cross bore in a tubular workpiece, showing the interfering contour in specific angular segments FIG. 1*a*: the view in the direction of arrow 1*a* of FIG. 1 along the longitudinal axis of the deburring tool FIG. 1*b*: the view in the direction of arrow 1*b* of FIG. 1 into the main bore of the workpiece, showing the case of interference in which the blade would break, and which is to be avoided FIG. 1*c*: the same diagram as in FIG. 1*b* with the deflection of the deburring blade according to the invention to avoid breakage of the blade according to FIG. 1*b*

Figure 1D:
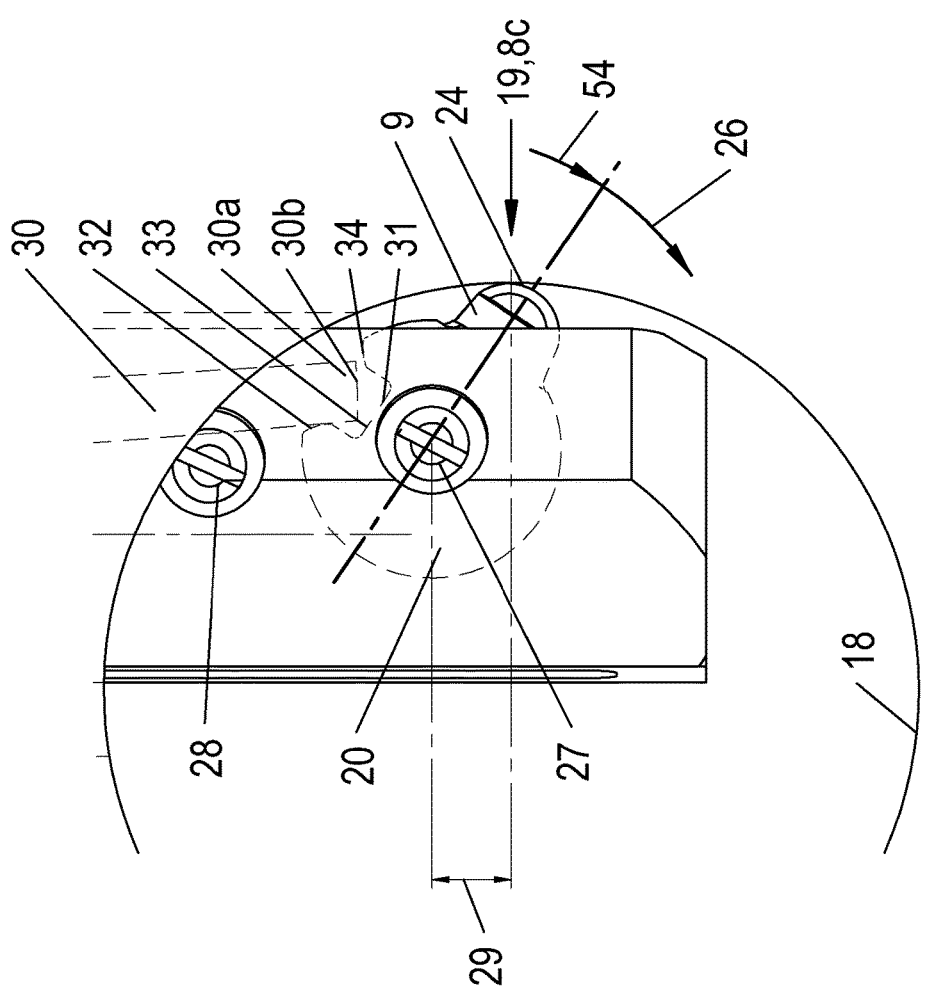
Figure 2:
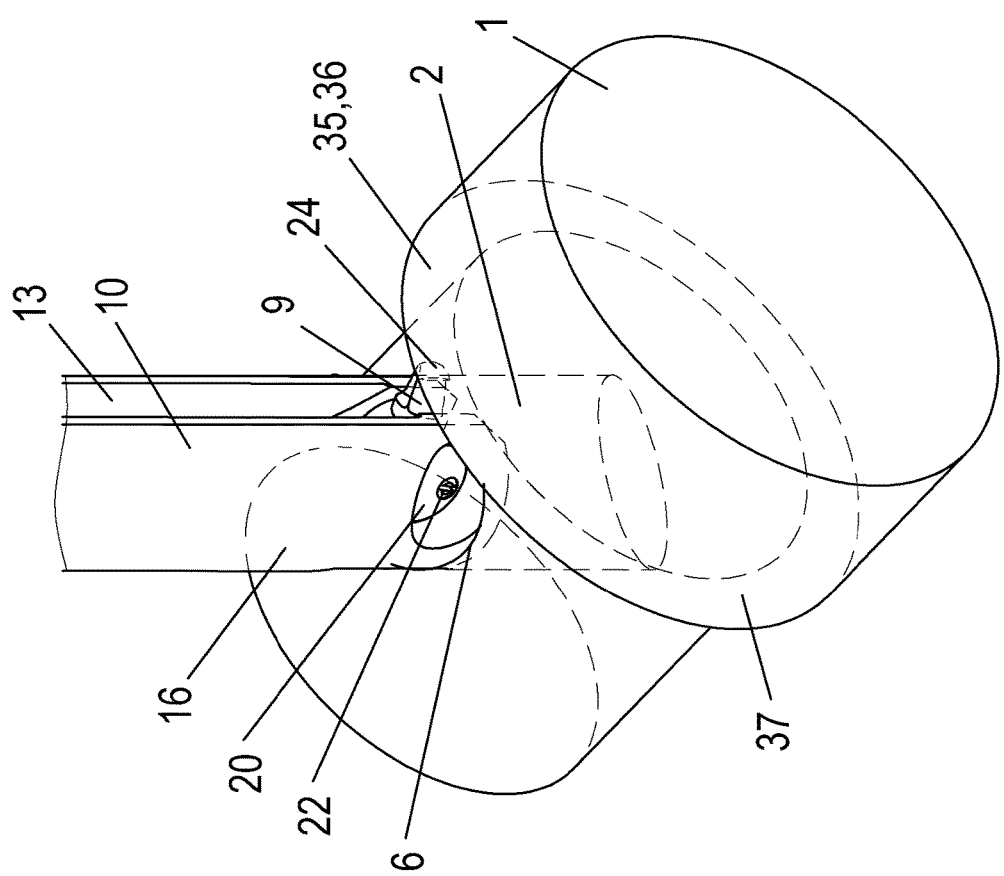
Figure 2A:
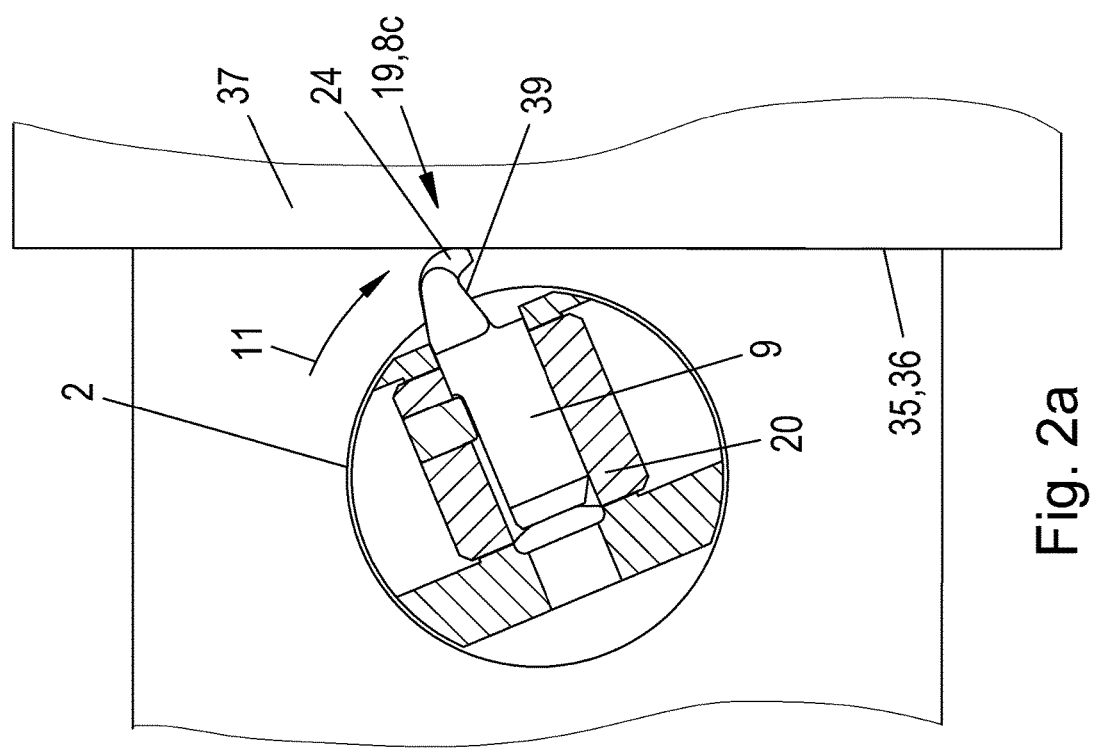

FIG. 1*d*: an enlarged view of the end of the bending spring of FIG. 1*c*, illustrating the control cam FIG. 2: the diagram of a deburring process involving the external deburring of a cross bore, in which the external deburring is impeded by a protruding flange ring on a tubular workpiece FIG. 2*a*: the view along the longitudinal axis of the deburring tool, similar to the diagram of FIG. 1*a*

Figure 3:
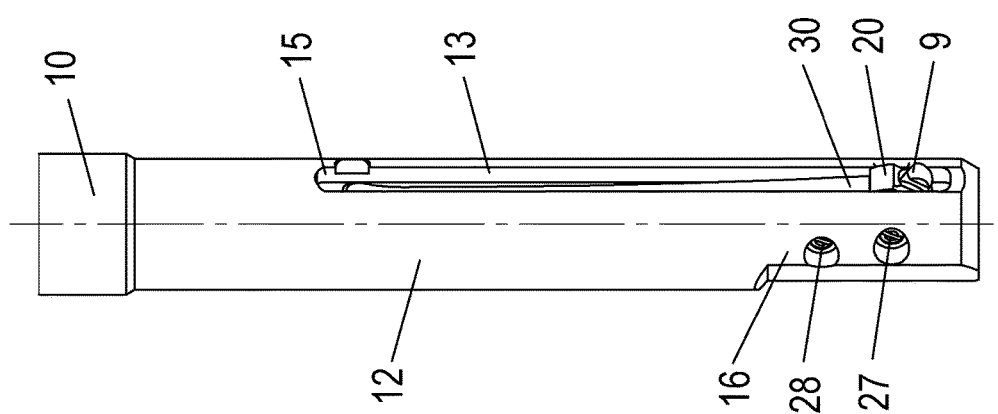

FIG. 2*b*: the side view of the cross bore in a workpiece made of solid material FIG. 2*c*: the introduction of the deburring tool into the cross bore, with the deburring blade in a deflected position in which breakage is avoided FIG. 3: the side view of a deburring tool according to the invention, with a deburring blade which is arrested, spring-loaded, in an angular position deviating from 90°

Figure 4:
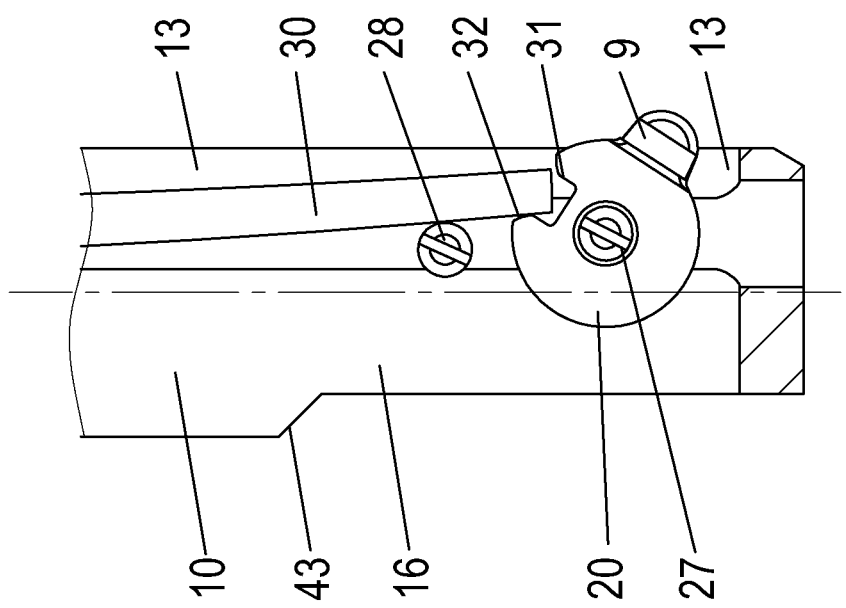

FIG. 4: a first embodiment of the spring-loaded arrest of the deburring blade in an angular position deviating from 90°

Figure 5:
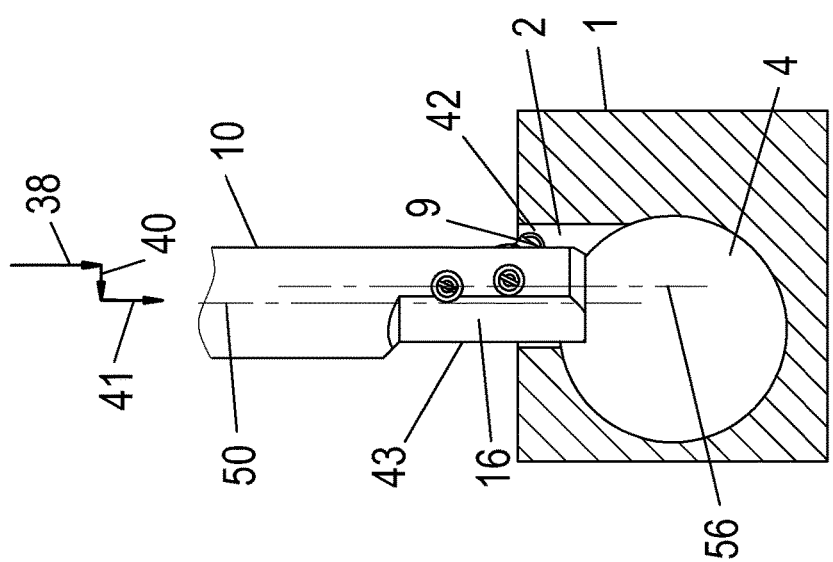
Figure 6:
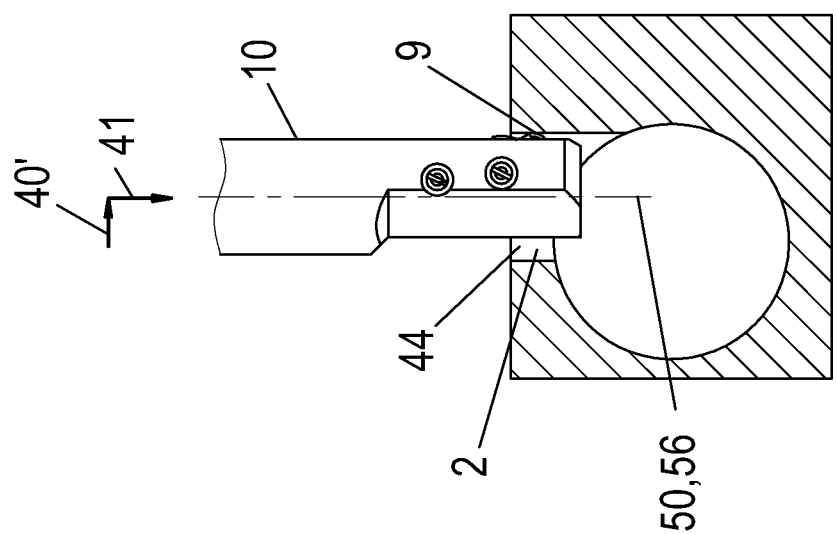
Figure 7:
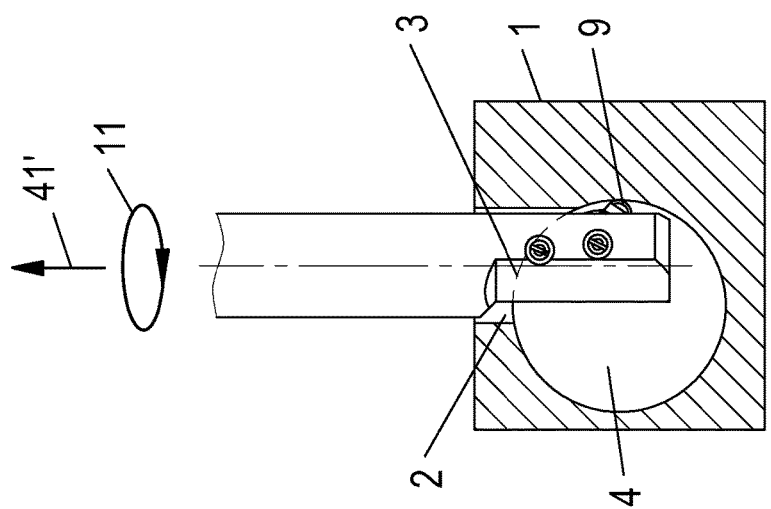
Figure 8:
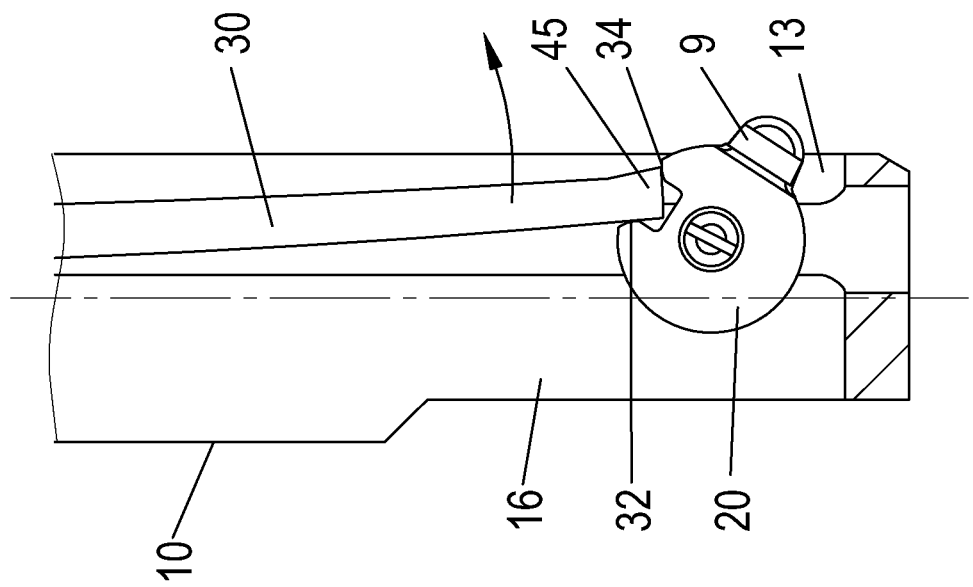

FIG. 5: a first method step of introducing the deburring tool into a cross bore FIG. 6: the second method step of introducing the deburring tool into the cross bore FIG. 7: the third method step of introducing the deburring tool into the cross bore, with subsequent deburring FIG. 8: a second embodiment of a deburring tool having a spring-loaded arrest of the deburring blade, deviating from a 90° neutral position FIG. 9: a third embodiment showing a modified variant of the deburring blade FIG. 10: a further configuration of the invention FIG. 11: an embodiment modified from that of FIG. 10

FIG. 1 shows a first use of the invention, in which a cross bore 2 is arranged in a tubular workpiece 1, and the inner edge 3 of this cross bore 2 is to be deburred using the deburring tool 10 of the invention, wherein a deburring blade 9 angled obliquely outward from the longitudinal axis 50 of the deburring tool 10 is used for deburring the inner edge 3.

The tubular workpiece has a main bore 4, which is intersected by the cross bore 2, producing an inner edge 3, which is to be deburred, and an outer edge 6.

In a known manner, the tubular workpiece 1 has two opposing end faces 5*a*, 5*b*, and the deburring blade 9 is to be used for internal deburring of the interior inner edge 3, which is coincident with the tubular inner surface 18. The inner edge 3, which has the un-round interfering contours that are to be deburred, is therefore to be deburred using the deburring blade 9 according to the invention.

For purposes of clarity, the arrows 7, which represent only rotational positions of deburring tool 10, form various segments 8a, 8b, 8c and 8d, which are merely sector-like regions that result along the inner edge 3 to be deburred, and in the area of these segments, segment 8c represents the critical region, specifically the region in which the deburring blade 9 enters into a neutral position and can result in a break.

The critical segment 8c, in which deburring blade 9 reaches an undesirable position where it is susceptible to breakage applies only if deburring tool 10 is driven in a clockwise direction; if the deburring tool is driven in a counterclockwise direction, a different segment, specifically segment 8b, would be the critical segment that forms a contour on the periphery of inner edge 3 where the deburring blade 9 is at risk of breaking.

Deburring tool 10 consists substantially of an approximately cylindrical base body 12, on the one side of which a longitudinal groove 13 is arranged, in which a clamping strip 15 is secured with the help of screws 14 and securely clamps one end of a flexible spring 30, which will be described later.

The other end of flexible spring 30 acts on a blade holder 20, in which deburring blade 9 is clamped.

Also important for the method described in the following is that base body 12 has at its lower end an undercut 43 where the diameter of the base body is decreased, so that the base body transitions into a base body portion 16 in which the diameter is decreased. The base body portion 16 having a decreased diameter is the portion in which the blade holder 20 is arranged with deburring blade 9 secured thereto. Deburring blade 9 may be permanently arranged in blade holder 20 or may also be replaceable (see EP 2 671 656 A1).

By definition, this results in an interfering contour 36, because the inner wall 3 of cross bore 2 lies close to tubular inner surface 18.

The tubular wall 17 of the tubular workpiece 8 is defined by tubular inner wall 18.

FIG. 1a shows the view along the longitudinal axis of deburring tool 10 as a cross-section of the lower base body portion 16, where it is apparent that a blade holder 20 is held in base body portion 16 so as to be capable of rotating around a rotational axis, specifically around a blade bearing 27, wherein on one side of the blade holder 20 a securing pin 22 is arranged, which holds the deburring blade 9 securely clamped in blade holder 20.

Deburring blade 9 is embodied as a single-edge blade, with cutting edge 39 being shown on the bottom, and the forward-most portion of deburring blade 9 being formed by a sliding bearing 24, with which the deburring blade slides along the tubular inner surface 18 of workpiece 1.

FIG. 1a shows the collision case that is to be avoided according to the invention, in which deburring blade 9 strikes with the tubular inner surface 18 with its longitudinal axis at an oblique angle, and sliding bearing 24 is no longer able to back away because the sliding bearing is still being moved forward toward tubular inner surface 18 in the direction of arrow 11, and in this case (as in the drawing of FIG. 1a) the deburring blade would break off.

Such an undesirable break thus occurs in the direction of arrow 19 in segment 8c, as was described in reference to FIG. 1.

The same case, specifically the case of a break in segment 8c, is illustrated again in FIG. 1b, where it is apparent that deburring blade 9 rests with its sliding bearing 24 arranged at its front end in a neutral position against the tubular inner surface 18, and has no clearance that will permit it to move either downward in the direction of arrow 26 or upward in the direction of arrow 26', because it is being held in the neutral position, and no deflecting torque is acting on deburring blade 9.

This collision case occurs when blade axis 55 of deburring blade 9 forms an angle (neutral angle 51) of 90° with the longitudinal axis 50 of deburring tool 10, designated as zero position 25.

The invention is intended to avoid such cases of breakage.

This is where the invention comes in, which provides according to FIG. 1c that deburring blade 9 is prevented from ever reaching a neutral or zero position 25 according to FIGS. 1a and 1b in that, according to the invention, deburring blade 9 is constantly held, spring-loaded and swivelable, in base body portion 16 in an angular position that deviates from zero position 25, and is prevented from swiveling back to the 90-degree position by means of a backstop.

Whereas FIG. 1c shows the neutral angle 51 to be avoided, which is therefore to be avoided, the same diagram shows that, according to the invention, an additional angle 53 is now assigned to deburring blade 9, so that its neutral position now corresponds to the new neutral angle 52.

This is carried out according to the invention in that the lower end 30a of flexible spring 30 extends into a control groove 31, but only the one side of flexible spring 30 rests against the one control edge 32 (see FIG. 1d) of control groove 31, while the opposite control edge 34 remains free and forms a backstop for blade holder 20.

According to FIG. 1d, control groove 31 is formed as a groove which is directed radially outward and is open on one side in blade holder 20, the width of said groove being slightly larger than the width of the end 30a of flexible spring 30 which engages in control groove 31. Said groove is approximately U-shaped in profile, and the base arm of the U-shaped profile is oriented parallel to a radial straight line through the blade bearing 27. The side arms of the U-shaped profile form the symmetrically mutually opposing control edges 32, 34, which open radially outward over rounded lateral surfaces. The U-shaped profile of control groove 31 is symmetrical to the radial axis through the blade bearing 27. The lower end face 30b of flexible spring 20 is positioned at a distance from the base arm of the U-shaped profile, creating a clearance 33 there.

This results in a preloading of blade holder 20 only in the direction of arrow 26, and as is clear from the diagram of FIG. 1d, the blade will be swiveled further downward in the direction of arrow 26 under torque 54 as a result of its oblique position, thereby preventing a risk of breakage.

It is therefore essential that the lower end 30a of flexible spring 30 extends into control groove with spacing therefrom, and rests only with one side edge against the one control edge 32, thus prestressing the blade holder, spring-loaded, in only one direction (diversion clearance 26), while in the other direction, the end 30a of flexible spring 30 would come to rest immediately against the opposing control edge 34, blocking the blade against swiveling back. This is the backstop according to the invention.

The deburring blade is thus held, spring-loaded, in a position in which it is swiveled away from base body portion 16 of deburring tool 10 at an angle that deviates from 90°.

FIG. 1d also shows that the distance between the swivel bearing of the blade, which is provided by blade bearing 27, and the point of application of the deburring blade on the tubular inner surface 18 results in a distance 29 which is desirable according to the invention, and which is necessary for achieving torque 54. The desired torque 54 always rotates deburring blade 9 out of an undesirable dead-center position.

In the case of a break—as was illustrated in FIGS. 1*a* and 1*b*—this distance 29 is absent, and as a result, the torque 54 that could ensure a deflection of the deburring blade out of the neutral position is also absent.

The deflection of flexible spring 30 resulting from the fact that only the left side of flexible spring 30 rests against the one control edge 32 of control groove 31 is achieved by means of a spring preloading pin 28, which rests against the lateral wall of flexible spring 30, deflecting it obliquely outward in such a way that control edge 32 is in contact with flexible spring 30, and as a result, blade holder 20 remains held, swiveled obliquely downward.

In the position shown in FIG. 1*d*, blade holder 20 has a small amount of clearance, however this is not essential.

The blade is therefore no longer able to move back into the neutral position, since this would be prevented by the positioning of control edge 34 against the end face 30*b* of flexible spring 30.

Therefore, flexible spring 30 is moved out of its neutral home position by means of spring preloading pin 28 into an oblique position, and ensures that only one lateral edge of flexible spring 30 rests against control edge 32 of control groove 31.

In a further development, it can be provided that spring preloading pin 28 is embodied as adjustable and as rotatable as an eccentric pin, making the adjustment clearance or the deflection of flexible spring 30 into an oblique position adjustable.

FIG. 2 shows a further application of the present invention, wherein in a solid workpiece 1 a cross bore 2 is arranged, and the deburring of cross bore 2 is impeded by a flange ring 37 protruding from workpiece 1.

Cross bore 2 lies close enough to flange ring 37 that the case of breakage is again encountered according to FIG. 2, in which the sliding bearing 24 of deburring blade 9, which is swiveled away from base body portion 16 into a neutral angular position of 90°, collides with the end face 35 of flange ring 37; this end face 35 thus forms the interfering contour 36.

The collision case occurs here as well because in deburring segment 8*c*, blade holder 20 with the deburring blade 9 clamped thereon, which is driven in the direction of arrow 11, is unable to back away in the direction of arrow 19, and in the drawing of FIG. 2*a*, the sliding bearing 24 of the deburring blade would break off.

The collision case similar to the collision case of FIG. 1*b* is also shown in FIG. 2*b*, where it is apparent that in the region of cross bore 2, the right borehole edge is positioned close enough to flange ring 37 that collision again occurs, and the blade, which is swiveled 90° outward from deburring tool 10, has no clearance to allow deflection 26, 26' either upward or downward, and as a result, it would break.

This is where the invention comes in, which provides according to FIG. 2*c* that, with a deburring tool 10 which is driven in a clockwise direction, deburring blade 9 now occupies a constantly predetermined oblique position as the neutral position of blade axis 55, thereby avoiding the collision case according to FIGS. 2*b* and 2*a*.

FIG. 3 shows a first embodiment of a deburring tool 10, in which the additional details already described in reference to FIG. 1 are shown.

As is apparent here, the base body portion 16 with a decreased diameter is located at the lower end of base body 12, and in this region, deburring blade 9 is held spring-loaded with blade axis 55 in a constantly oblique position.

FIG. 4 shows, as a first embodiment example, one option for holding flexible spring 30 in a spring-preloaded oblique position.

For this purpose, spring preloading pin 28 is provided, which is positioned against the inner side of flexible spring 30 so that the flexible spring is supported obliquely and spring-loaded against spring preloading pin 28, ensuring that only control groove 31 of blade holder 20, with the help of control edge 32, rests against the one side of flexible spring 30, thereby holding blade holder 20, spring-preloaded, in an oblique downward position in the neutral position.

FIGS. 5 to 7 show the sequence of steps in the method according to the invention.

In a first method step, deburring tool 10 is introduced into cross bore 2 in the direction of arrow 38, concentrically with cross bore axis 56 of cross bore 2, until sliding bearing 24 of deburring blade 9 is just outside of cross bore 2.

As soon as sliding bearing 24 is at the front edge of cross bore 2, the forward feed movement in the direction of arrow 38 is interrupted, and in a subsequent method step, movement is carried out in transverse direction 40, in order to move the base body 12 of the deburring tool eccentrically and transversely to cross bore axis 56 of deburring tool 10.

This serves to ensure that deburring blade 9, which is already protruding out of base body 12, will not collide with the right side of cross bore 2, and results in clearance 42.

Once clearance 42 has been achieved, introduction into cross bore 2 in the longitudinal direction of arrow 41 can be continued, until sliding bearing 24 has just entered into cross bore 2, and only then is the tool pulled back in the transverse direction along arrow 40', as shown in FIG. 6, thereby moving the longitudinal axis 50 of deburring tool 10 in alignment with cross bore axis 56 of cross bore 2.

Blade 9 is thus already moved, spring-loaded, out of its obliquely extended position into a further obliquely extended position, without risk of collision or breakage.

In the transition from FIG. 6 to FIG. 7, longitudinal movement in longitudinal direction 41 continues until the deburring tool has been advanced into its starting position shown in FIG. 7, for the start of the deburring process.

Proceeding from this starting position, deburring tool 10 is driven in the direction of arrow 11 and executes the deburring process, in which the cutting edge 39 of deburring blade 9 is placed against the inner side of cross bore 2 and executes a deburring of the inner edge 3 of cross bore 2, advancing circumferentially.

This is carried out with retraction in the direction of arrow 41'.

As is clear from this diagram, with the deburring blade 9 held constantly in its deburring position, spring-loaded obliquely downward, there is no longer a risk of breakage on an interfering contour 36.

FIG. 8 shows, as a modified embodiment example from the embodiment example of FIG. 4, that the spring preloading pin 28 could also be dispensed with, and in its place, the end 30*a* of flexible spring 30 could be embodied as a tapered, widened portion 45, with the tapered, widened portion resting on both the left control edge 32 and the right control edge 34 of control groove 31, thus holding deburring blade 9 spring-preloaded in a position directed obliquely downward, preventing it from swiveling back into a 90° angle position. This is a further embodiment of a backstop.

As a further embodiment example, FIG. 9 shows that the blade holder does not necessarily need to be integrally connected to deburring blade 9. As an alternative, FIG. 9 shows a blade holder 20 in which deburring blade 9 is held detachably in the blade holder, and the detachable mount is achieved by means of a retaining pin 46, which engages in a laterally open groove on deburring blade 9.

When retaining pin 46 is removed from blade holder 20, deburring blade 9 can thus be removed.

Otherwise, the same reference signs are used for the same parts.

FIG. 10 shows a further embodiment example in which flexible spring 30 can also be preloaded in the oblique direction by means of a preloading pin 47 arranged perpendicular relative to the longitudinal axis 50 of deburring tool 10; this preloading pin likewise preloads flexible spring 30 obliquely, ensuring that the one control edge 32 of control groove 31 rests against the one side of flexible spring 30 and prevents deburring blade 9 from moving into a neutral position in which it is swiveled outward 90°. Instead, it remains arrested, spring-loaded, in a position directed obliquely downward.

The same function is shown in the embodiment example according to FIG. 11, where it is apparent that a peripheral groove 48 of reduced diameter is provided on the blade holder 20, the groove forming stops 48a, 48b at its two sides and having a locking pin 49 in the region of peripheral groove 48.

Locking pin 49 therefore likewise forms a stop for limiting the swiveling of deburring blade 9 obliquely outward, so that flexible spring 30 cannot come to rest against control edge 32, because this oblique preloading or stop limitation is accomplished by means of locking pin 49.

In this embodiment example it is clear that flexible spring 30 could also be dispensed with, and in its place a spiral spring or helical compression spring could hold blade holder 25, spring-preloaded, in its outward swiveled position.

The provision of a flexible spring which is clamped at one end with its unattached end being supported against the blade holder thus may also be replaced by other spring preloading devices, or generally—stored-energy devices.

LIST OF REFERENCE SIGNS

1 workpiece (tube)
2 cross bore
3 inner edge (of 2)
4 main bore
5 end face (of 1) a, b
6 outer edge (of 2)
7 arrow direction
8 segment a, b, c, d
9 deburring blade
10 deburring tool
11 arrow direction
12 base body
13 longitudinal groove
14 screw
15 clamping strip
16 base body portion
17 tubular wall (of 1)
18 tubular inner surface
19 arrow direction
20 blade holder
21 bearing bore for 9'
22 securing pin
23
24 sliding bearing
25 zero position
26 deflecting clearance 26'
27 blade bearing
28 spring preloading pin
29 distance
30 flexible spring 30a end 30b end face
31 control groove
32 control edge
33 clearance
34 control edge
35 end face (of 1)
36 interfering contour
37 flange ring
38 arrow direction
39 cutting edge (of 9)
40 transverse direction 40'
41 longitudinal direction 41'
42 clearance
43 undercut (front)
44 undercut (rear)
45 tapered, widened portion
46 retaining pin
47 preloading pin
48 peripheral groove 48a, 48b stop
49 locking pin
50 longitudinal axis
51 neutral angle (old)
52 neutral angle (new)
53 additional angle
54 torque
55 blade axis
56 cross bore axis

The invention claimed is:

1. A deburring tool with a deburring blade for deburring borehole edges that have a straight or un-round shape, comprising of a base body which is rotatably driven about its longitudinal axis, and at the lower end of which at least one blade holder with at least one deburring blade secured therein is mounted on a blade bearing on the side of the base body so as to swivel vertically about an axis generally perpendicular to the longitudinal axis of the base body, and on the outer periphery of the blade holder a control groove which is open radially outward is arranged, into which the free end of a flexible cantilever beam spring engages, the other end of said cantilever beam spring being clamped to the base body, wherein during the deburring process, the deburring blade is swiveled radially outwardly away from the base body at an angle in relation to the longitudinal axis of the base body, and the blade axis of the deburring blade rests, spring-loaded, with its at least one cutting edge against the borehole edge to be deburred, and executes spring-loaded swiveling movements that follow the contour of the borehole edge as the deburring tool is rotated, wherein the blade axis of the deburring blade, in the home position in which it is swiveled away from the base body, forms an angled swivel position that deviates from a 90-degree position relative to the longitudinal axis of the base body, and in that a backstop is assigned to the deburring blade which cooperates with the free end of the cantilever beam spring, to prevent the debarring blade from swiveling back into the 90-degree position relative to the longitudinal axis of the base body.

2. The deburring tool according to claim 1, wherein when the deburring tool is used for reverse deburring, the blade axis is positioned obliquely at a negative additional angle that ranges from 0° to 80°.

3. The deburring tool according to claim 1, wherein when the deburring tool is used for forward deburring, the blade axis is positioned obliquely at a positive additional angle that ranges from 0° to 80°.

4. The deburring tool according to claim 1, wherein the deburring blade is embodied as a single-edge blade having a cutting edge arranged on a single side, and in that the forward-most portion of the deburring blade is formed by a sliding bearing, with which the deburring blade rests slidingly against the tubular inner surface of the workpiece.

5. The deburring tool according to claim 1, wherein the neutral position of the deburring blade is defined by a neutral angle, which deviates by an additional angle from the position of the blade axis in which it is swiveled at a 90-degree angle from the base body, and in that this neutral position of the deburring blade is defined by the single-sided engagement of the lower end of the flexible spring into the control groove on the blade holder side.

6. The deburring tool according to claim 5, wherein the control groove is embodied as a U-shaped profile which is open radially outward, in that the one side of the flexible spring rests, spring-loaded, against a control edge on one side of the control groove, and in that the opposite control edge of the control groove forms the backstop for the blade holder.

7. A method for operating a deburring tool for the reverse deburring of borehole edges that have a straight or un-round shape, comprising of a base body which is rotatably driven about its longitudinal axis, and at the lower end of which at least one blade holder with at least one deburring blade secured therein is mounted on a blade bearing on the base body side so as to swivel vertically about an axis generally perpendicular to the longitudinal axis of the base body, and on the outer periphery of the blade holder a control groove which is open radially outward is arranged, into which the free end of a flexible cantilever beam spring engages, the other end of said cantilever beam spring being clamped to the base body, wherein during the deburring process, the deburring blade is swiveled radially outwardly away from the base body at an angle in relation to the longitudinal axis of the base body, and the blade axis of the deburring blade rests, spring-loaded, with its at least one cutting edge against the borehole edge to be deburred, and executes spring-loaded swiveling movements that follow the contour of the borehole edge as the deburring tool is rotated, wherein:

in a first method step, the deburring tool is moved, concentrically with the cross bore axis of a cross bore to be deburred, up to the cross bore until a sliding bearing at the front, unattached end of the bar-shaped deburring blade is located just outside of the cross bore, in that in a second method step, the forward feed movement is interrupted as soon as the sliding bearing is at the front edge of the cross bore, in that in a third method step, the deburring tool executes a movement in the transverse direction to move the deburring tool eccentrically and transversely to the cross bore axis until radial clearance is achieved between the deburring blade, which is swiveled away from the deburring tool, and the cross bore, in that in a fourth method step, the deburring tool is introduced further longitudinally into the cross bore until the sliding bearing has just entered into the cross bore, in that in a fifth method step, the deburring tool is moved back in the transverse direction in order to bring the longitudinal axis of the deburring tool in alignment with the cross bore axis of the cross bore, in that in a sixth method step, longitudinal movement is continued until the deburring tool is moved forward into its starting position at the start of the deburring process, and in that in a seventh method step, proceeding from this starting position, the deburring tool is rotationally driven and executes the deburring process, wherein as the deburring tool is moved back in the vertical direction, the deburring blade rests with its cutting edge against the inner side of the cross bore, and executes a deburring, advancing circumferentially, of the inner edge of the cross bore.

8. A method for operating a deburring tool for the forward deburring of borehole edges that have a straight or un-round shape, comprising of a base body which is rotatably driven about its longitudinal axis, and at the lower end of which at least one blade holder with at least one deburring blade secured therein is mounted on a blade bearing on the side of the base body so as to swivel vertically about an axis generally perpendicular to the longitudinal axis of the base body, and on the outer periphery of the blade holder a control groove which is open radially outward is arranged, into which the free end of a flexible cantilever beam spring engages, the other end of said cantilever beam spring being clamped to the base body, wherein during the deburring process, the deburring blade is swiveled radially outwardly away from the base body at an angle in relation to the longitudinal axis of the base body, and the blade axis of the deburring blade rests, spring-loaded, with its at least one cutting edge against the borehole edge to be deburred, and executes spring-loaded swiveling movements that follow the contour of the borehole edge as the deburring tool is rotated, wherein:

in a first method step, the deburring tool is moved, concentrically with the cross bore axis of a cross bore to be deburred, up to the cross bore until a sliding bearing at the front, unattached end of the bar-shaped deburring blade is located just outside of the cross bore, in that in a second method step, the forward feed movement is interrupted as soon as the sliding bearing is at the front edge of the cross bore, in that in a third method step, the deburring tool executes a movement in the transverse direction to move the deburring tool eccentrically and transversely to the cross bore axis until radial clearance is achieved between the deburring blade, which is swiveled away from the deburring tool, and the cross bore, in that in a fourth method step, the longitudinal movement is continued until the deburring tool has been moved forward into its starting position at the start of the deburring process, and in that in a fifth method step, proceeding from this starting position, the deburring tool is rotationally driven and executes the deburring process, wherein as the deburring tool is moved forward in the vertical direction, the deburring blade rests with its cutting edge against the outer side of the cross bore, and executes a deburring, advancing circumferentially, of the outer edge of the cross bore.

9. The method according to claim 8, wherein the neutral position of the deburring blade is no longer the position in which it is swiveled at a 90° angle from the base body of the deburring tool, and instead the blade axis of the deburring blade occupies a swiveled position in which it is angled from the neutral position, and in that a backstop is assigned to the deburring blade, which prevents it from swiveling back to the 90-degree position.

10. The method according to claim 9, wherein, during reverse deburring, the deburring tool is moved upward vertically relative to the workpiece, in which case the blade axis of the deburring blade is directed obliquely downward opposite the feed direction, and in that during deburring of a borehole edge in the forward direction, the deburring tool is moved vertically downward relative to the workpiece, and the blade axis of the deburring blade is directed obliquely upward opposite the feed direction.

* * * * *

UNITED STATES PATENT AND TRADEMARK OFFICE
CERTIFICATE OF CORRECTION

PATENT NO. : 10,183,345 B2
APPLICATION NO. : 15/379828
DATED : January 22, 2019
INVENTOR(S) : Harry Studer et al.

It is certified that error appears in the above-identified patent and that said Letters Patent is hereby corrected as shown below:

On the Title Page

Item [57] ABSTRACT, delete Lines 1-28, "A deburring tool … base body 12." in its entirety, insert --A deburring tool has a deburring blade (9) for deburring borehole edges (3, 6) that have a straight or un-round shape, consisting of a base body (12) which is rotatably driven about its longitudinal axis (50), and at the lower end of which at least one blade holder (20) with at least one deburring blade (9) secured therein is mounted on a blade bearing (27) on the side of the base body so as to swivel vertically, and on the outer periphery of the blade holder (20) a control groove (31) which is open radially outward is arranged, into which the freely flexible end (30a) of a flexible spring (30) engages, the other end of said spring being clamped to the base body (12).--.

In the Specification

Column 4, Line 41, insert a carriage return and paragraph indent after --cross bore--.

In the Claims

Column 10, Line 34, in Claim 1, Line 3, delete "… comprising of a base body which is …"; insert --… comprising a base body which is …--.

Column 10, Line 58, in Claim 1, Line 27, delete "… to prevent the debarring blade from …"; insert --… to prevent the deburring blade from …--.

Column 11, Line 28, in Claim 7, Line 3, delete "… shape, comprising of a base body which…"; insert --… shape, comprising a base body which …--.

Column 12, Line 15, in Claim 8, Line 3, delete "… shape, comprising of a base body which …"; insert --… shape, comprising a base body which …--.

Signed and Sealed this
Eighteenth Day of May, 2021

Drew Hirshfeld
*Performing the Functions and Duties of the
Under Secretary of Commerce for Intellectual Property and
Director of the United States Patent and Trademark Office*